(12) United States Patent
Abouelwafa et al.

(10) Patent No.: US 11,119,682 B2
(45) Date of Patent: Sep. 14, 2021

(54) COMPRESSED EXTENT VERSIONS

(71) Applicant: HEWLETT PACKARD ENTERPRISE DEVELOPMENT LP, Houston, TX (US)

(72) Inventors: Ayman Abouelwafa, Folsom, CA (US); Salil Gokhale, Fremont, CA (US); Srinivasa D. Murthy, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 15 days.

(21) Appl. No.: 16/526,180

(22) Filed: Jul. 30, 2019

(65) Prior Publication Data
US 2021/0034265 A1    Feb. 4, 2021

(51) Int. Cl.
*G06F 3/06* (2006.01)

(52) U.S. Cl.
CPC ............ *G06F 3/0644* (2013.01); *G06F 3/065* (2013.01); *G06F 3/0619* (2013.01); *G06F 3/0665* (2013.01); *G06F 3/0683* (2013.01)

(58) Field of Classification Search
CPC ...... G06F 3/0644; G06F 3/0619; G06F 3/065; G06F 3/0665; G06F 3/0683
USPC .......................................................... 711/173
See application file for complete search history.

(56) References Cited

U.S. PATENT DOCUMENTS

| | | | |
|---|---|---|---|
| 7,334,095 B1 * | 2/2008 | Fair | G06F 3/0607 711/161 |
| 7,716,183 B2 | 5/2010 | Lee | |
| 7,743,031 B1 * | 6/2010 | Cameron | G06F 3/0689 707/649 |
| 8,335,771 B1 * | 12/2012 | Natanzon | G06F 11/2074 707/684 |
| 8,862,546 B1 * | 10/2014 | Natanzon | G06F 11/1471 707/637 |
| 9,223,659 B1 * | 12/2015 | Natanzon | G06F 11/1469 |
| 9,563,517 B1 * | 2/2017 | Natanzon | G06F 11/1464 |
| 9,606,875 B2 | 3/2017 | Bushman | |
| 10,055,149 B2 | 8/2018 | Dewey et al. | |
| 10,156,993 B1 * | 12/2018 | Armangau | G06F 3/064 |
| 10,157,006 B1 * | 12/2018 | Armangau | G06F 3/0608 |

(Continued)

OTHER PUBLICATIONS

Bowlzee129 et al., "What's the best practice for moving volumes between arrays?", Hewlett Packard Enterprise Community, Mar. 8, 2016, 3 pages.

(Continued)

*Primary Examiner* — Christopher B Shin
(74) *Attorney, Agent, or Firm* — Hewlett Packard Enterprise Patent Department (57) ABSTRACT

Examples include compressed extent versions. Examples may create an empty target virtual volume tree having a tree structure of a source virtual volume tree of a source storage system, the source virtual volume tree comprising source base and source snapshot virtual volumes, each representing respective versions of a plurality of extents, wherein each of the extents corresponds to a different portion of an address space of the source base virtual volume. Examples may include compressed extent collections, each comprising a compressed representation of multiple populated versions of a single extent from the source base and snapshot virtual volumes, the multiple populated versions compressed relative to one another.

20 Claims, 6 Drawing Sheets

(56) References Cited

U.S. PATENT DOCUMENTS

| | | | | |
|---|---|---|---|---|
| 10,430,376 B1* | 10/2019 | Armangau | ........... | G06F 16/1744 |
| 10,459,664 B1* | 10/2019 | Dreier | ................. | G06F 11/1458 |
| 10,514,861 B1* | 12/2019 | Basov | ................... | G06F 3/0653 |
| 2016/0004467 A1 | 1/2016 | Green et al. | | |
| 2018/0260125 A1* | 9/2018 | Botes | ...................... | G06F 3/067 |
| 2019/0339911 A1* | 11/2019 | Bassov | ................... | G06F 3/065 |
| 2020/0042219 A1* | 2/2020 | Wang | .................... | G06F 3/0689 |
| 2020/0042220 A1* | 2/2020 | Armangau | ............ | G06F 3/0643 |
| 2020/0042399 A1* | 2/2020 | Kuang | ................. | G06F 11/1435 |
| 2020/0042617 A1* | 2/2020 | Kuang | ................. | G06F 3/0608 |
| 2020/0142628 A1* | 5/2020 | Armangau | ............ | G06F 3/0641 |

OTHER PUBLICATIONS

Nimble Storage, Inc., "Best Practices Guide: Nimble Storage Best Practices for Scale-Out", 2012, pp. 1-10.

Nimble Storage, Inc., "Command Reference", Version 2.3, 2015, pp. 1-185.

Lee, J. et al., "Enhancing Data Migration Performance via Parallel Data Compression," 2006, http://citeseerx.ist.psu.edu/viewdoc/download?doi=10.1.1.118.1150&rep=rep1&type=pdf.

Mostafa Khalil, "ALUA," Oct. 5, 2017, vSphere 6: A Technology Deep Dive, 2nd Edition, http://www.pearsonitcertification.com/articles/printerfriendly/2819032.

* cited by examiner

FIG. 5

COMPRESSED EXTENT VERSIONS

BACKGROUND

A computing system, such as a storage system (e.g., a storage array), server, or the like, may take snapshot(s) of a volume, such as a virtual volume, or any other type of collection of data. Taking a snapshot of a volume may generate a snapshot volume (e.g., a snapshot virtual volume) that is a representation of the data contents of the volume as it existed at (or near) the point in time when the snapshot was created or "taken". A volume from which a snapshot is taken may be referred to as a "base" volume (such as a base virtual volume).

A snapshot volume may represent a base volume via metadata and a collection of data (though the collection of data may initially be empty in some examples). For example, at the time the snapshot is taken, the snapshot volume may represent the same data that is presently contained in the base volume with metadata including a collection of pointers back to the data stored in the base volume. When changes are made to data of the base volume after the snapshot is taken (e.g., due to writes to the base volume), steps may be taken to preserve the data represented by the snapshot.

For example, when copy-on-write techniques are used, for each storage location of the base volume, the first write to the location after taking the snapshot may cause the data present at that location (prior to the write) to be copied out of the base volume and into storage space for the snapshot volume before overwriting the data present at that location in the base volume, in order to preserve the data represented by the snapshot. In other examples, when redirect-on-write techniques are used, after a snapshot is taken, writes to locations of the base volume are re-directed to another location such that data represented by the snapshot volume are preserved in the original locations in which that data existed in the base volume prior to the snapshot.

In some examples, taking multiple snapshots relative to a volume may form a "tree" (or "virtual volume tree" herein) including a base volume and one or more snapshot volume(s), wherein each of the snapshot volume(s) may descend directly from the base volume or indirectly from the base volume (e.g., by descending directly from another snapshot volume descending directly or indirectly from the base volume).

BRIEF DESCRIPTION OF THE DRAWINGS

The following detailed description references the drawings, wherein.

DETAILED DESCRIPTION

In some examples, it may be desirable to copy or migrate data from one storage system to another, for example, to balance data across a plurality of storage systems, to replace one storage system with another storage system (e.g., having capabilities not available on the storage system being replaced, etc.), or the like. It may be desirable to copy data to another storage system for backup or other data protection purposes, or the like.

As noted above, in some examples, a virtual volume may be a base virtual volume from which one or more snapshot virtual volumes descend directly or indirectly. There may be many beneficial uses for snapshot virtual volumes of a base virtual volume, such as, for example, for backup, replication, creating test and development (i.e., "test and dev") environments from production data, and the like.

In examples described herein, a base virtual volume and the snapshot virtual volume(s) that descend from it (along with metadata associating them) may be referred to collectively as a "virtual volume tree". In some examples, when a base virtual volume is copied or moved from a source storage system to a target storage system, it may be desirable to copy or migrate all the snapshot virtual volumes descending from the base virtual volume to the other storage system along with the base virtual volume, in order to preserve the benefits provided by the snapshot virtual volumes on the target storage system after the copying or migration. However, it may be difficult to transfer efficiently all of the data of a virtual volume tree (i.e., of the base virtual volume and all of the snapshot virtual volume(s) from it) from a source storage system to a target storage system over computer network(s) connecting the two systems.

In addition, in order to avoid excessive downtime, it may be desirable to copy or migrate the virtual volume tree while the virtual volumes of the virtual volume tree are available to serve data in response to read and write requests (referred to herein as the virtual volumes being "online"), such that hosts (e.g., other computing devices, such as a servers, or the like) may continue input/output (IO) operations to the virtual volumes during the copy or migration process. However, it may be more difficult to migrate the virtual volume tree while the virtual volumes are online than to copy or migrate them while they are offline (i.e., not available to serve data).

To address these issues, examples described herein may copy or migrate the virtual volumes of a virtual volume tree in a relatively efficient manner, and while the virtual volumes remain online, by providing data from a source virtual volume tree to a target virtual volume tree in compressed extent collections, each comprising a compressed representation of multiple populated versions of a single extent from the source base and snapshot virtual volumes.

In examples described herein, each virtual volume of a virtual volume tree may share the same virtual address space, and an "extent", as used herein, may represent a given portion of that address space for each of the virtual volumes of the virtual volume tree. In examples described herein, an extent may represent any suitable amount of address space and the corresponding amount of virtual volume storage space (e.g., 16 KB, 256 KB, etc.) represented by that portion of address space. In some examples, the extents of a virtual volume tree may be uniform in size for the virtual volume tree. In some examples, the extents of a virtual volume tree of a storage system may represent the smallest granularity (e.g., unit of space of a virtual volume) at which the storage system performs snapshot data preservation operations (e.g., copy-on-write, redirect-on-write, or the like).

In examples described herein, for each extent of a virtual volume tree, each virtual volume comprises a respective "version" of that extent that includes any information stored in the virtual volume at the portion of the address space represented by the extent. The information of an extent version may be, for example, data (e.g., data written by a host or "host data"), a pointer (or other metadata), or the like. In such examples, for a given extent, different extent versions may include different information.

For example, some extent versions may include pointers while others include host data. For extent versions including pointers, the pointers may point to different locations (e.g., different virtual volumes), even for the same extent. For extent versions including host data, different extent versions may include different host data, even for the same extent. For example, when using copy-on-write for snapshot virtual volumes, an extent version of a snapshot virtual volume for a given extent may include data that was previously stored in the extent version of the base virtual volume for the given extent at the time that the snapshot was taken, while the current extent version of the base virtual volume for the given extent may include a modified version of the prior data (e.g., modified by a write operation that caused a copy-on-write of the prior data to the snapshot virtual volume).

In such examples, while the different extent versions for the same extent may not be identical, they may still share much data in common. For example, writes that modify data of a base virtual volume may be much smaller than the size of virtual volume space represented by an extent (e.g., of an extent version). So, a copy-on-write operation, for example, may copy an initial extent version of the base virtual volume to the snapshot before overwriting just a portion of that initial extent version in the base virtual volume, resulting in the extent versions of the base and snapshot virtual volumes for the same extent potentially having a significant amount of data in common. Given this propensity for different versions of the same extent in a virtual volume tree to share significant amounts of data, a relatively high compression ratio may result when a plurality of extent versions of the same extent are compressed relative to one another, especially compared with other compression options (e.g., compressing different extent versions of the same virtual volume relative to one another, which are unlikely to share data to as high of a degree).

Examples described herein may copy or migrate data from a source virtual volume tree to a target virtual volume tree by providing the data in respective compressed extent collections, each of which may contain compressed versions of an extent compressed relative to one another, to obtain a relatively high compression ratio. In this manner, by communicating the data in compressed extent collections that may have a relatively high compression ratio, the communication of the data from the source to the target may be relatively efficient, and as such may also be scalable.

In addition, by communicating the data in compressed extent collections that represent all extent versions of a single extent for a virtual volume tree, all extent versions of a given extent are compressed at the same time, communicated to the target at the same time, and populated on the target virtual volume tree at the same time. In such examples, the source virtual volumes may remain online during the copy or migration process. For example, the source virtual volume tree may continue to process writes to the base virtual volume and perform snapshot data preservation operations (e.g., copy-on-write or redirect-on-write, or the like) to maintain the snapshot virtual volume(s) as well, as such write and preservation operations may operate on the extent versions of a single extent at a time. In such examples, in the case of a write to an extent of the source virtual volume, the write may be replicated to the target virtual volume as well. In cases in which the written extent has already been copied or migrated, then the same write (and possibly snapshot data preservation operation(s)) will be applied to the same data previously present in the extent versions of the source and target virtual volumes. In cases in which the written extent has not yet been copied, then changes at the source will be reflected in the target virtual volumes when that extent is copied or migrated. In either case, writes to the source do not disrupt the copy or migration process and may be allowed to continue without complicated tracking procedures, or other such complications to allow the source virtual volumes to remain online. Reads may also be serviced from the online source virtual volume during the copy or migration process, as the writes are being performed to the source and target, so the source continues to have the most up to date version of the data.

In this manner, examples described herein may enable source virtual volume tree copying or migration to a target virtual volume tree both efficiently and while the source virtual volume tree remains online and available to server reads and writes (e.g., from host(s)). Examples are described below in relation to the figures.

Figure 1:
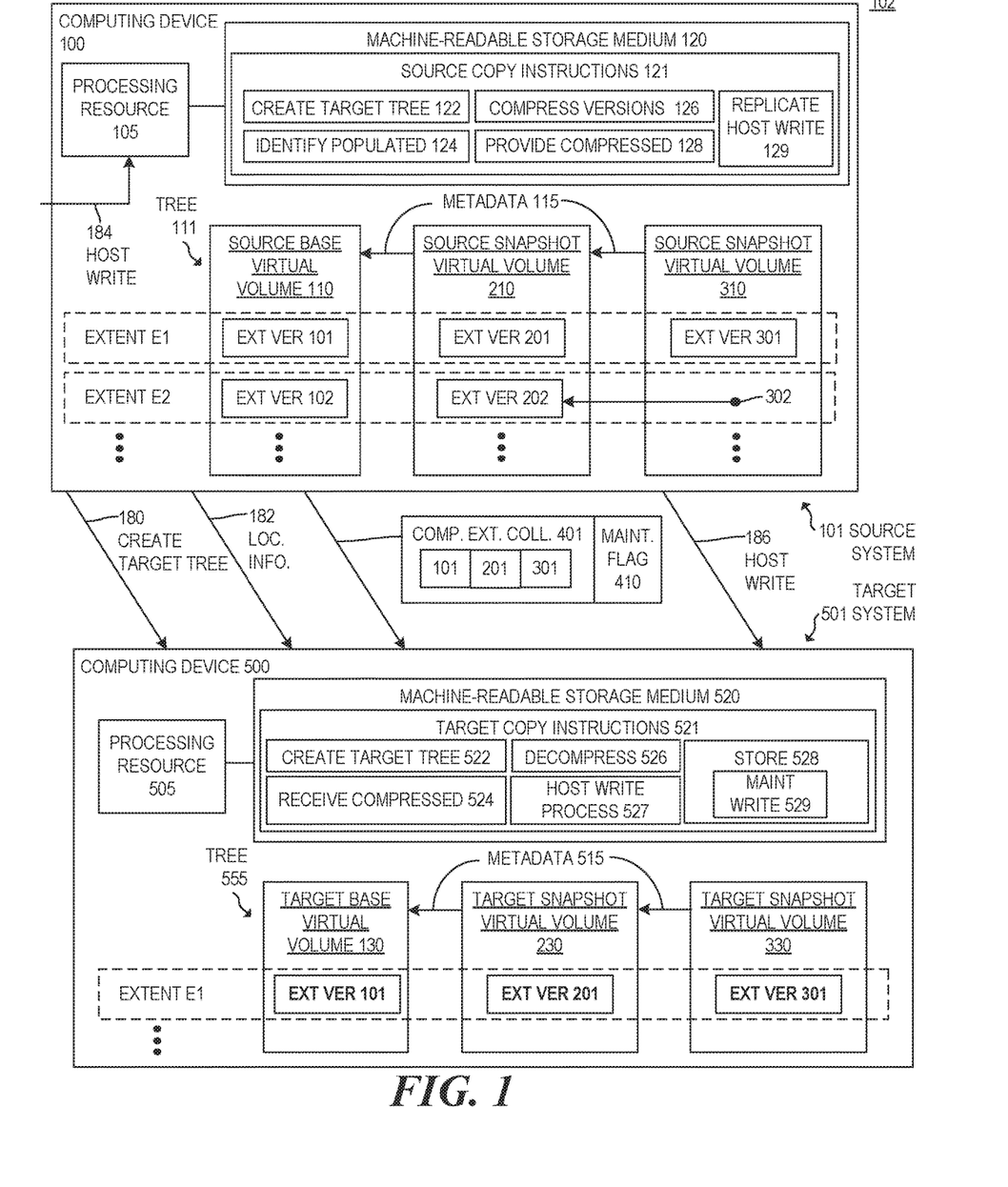
FIG. 1 is a block diagram of an example computing system to create a target virtual volume tree on a target storage system.

FIG. 1 is a block diagram of an example computing system 102 to create a target virtual volume tree 555 on a target storage system 501. In examples described herein, a "storage system" or "system" may be implemented by any suitable combination of hardware and software (e.g., machine-readable, instructions executable by a processing resource). For example, a system or storage system in examples described herein may be implemented a computing device (e.g., a storage array, a hyperconverged system, a computing device implementing software-defined storage (SDS), or the like), or a plurality of computing devices (e.g., a plurality of storage arrays, a plurality of hyperconverged systems, a plurality of computing devices implementing SDS, or the like). In the example illustrated in FIG. 1, computing system 102 (which may be referred to as system 102 or storage system 102) comprises a source storage system 101 and a target storage system 501 in communication with one another via one or more computer network(s). In examples described herein, source storage system 101 and target storage system 501 may each be any suitable type of storage system as described herein, or the like. In the example of FIG. 1, each of source and target storage systems 101 and 501 may be implemented by a respective computing device (e.g., storage array or hyperconverged system). In other examples, each of source storage system 101 and target storage system 501 may be implemented within a single computing device (e.g., storage array), a single hyperconverged system, or a single SDS system, or the like. In such examples, the source virtual volume tree copying or migration to a target virtual volume tree may comprise copying or migrating from a source virtual volume tree to a target virtual volume tree with the same computing device (e.g., within a storage array, hyperconverged system, SDS system, or the like). In examples described herein, a computer network may include, for example, a local area network (LAN), a virtual LAN (VLAN), a wireless local area network (WLAN), a virtual private network (VPN), the Internet, an internal application-specific integrated circuit (ASIC) and/or a software transport, or the like, or a combination thereof. In examples described herein, a communication channel may include any such computer network(s), any other type of transport between systems, any other type of transport within a system (e.g., within a storage array, a hyperconverged system, a SDS system, or the like), or a combination thereof.

Referring again to the example of FIG. 1, source storage system 101 may comprise a computing device 100 and target storage system may comprise a computing device 500. Each of computing devices 100 and 500 may be any suitable type of computing device as described herein, such as a storage array, a server, or the like. Computing device 100 of source storage system 101 may comprise at least one processing resource 105 (which may be referred to herein as a "source" processing resource 105) and at least one machine-readable storage medium 120 comprising (e.g., encoded with) at least source copy instructions 121 that are executable by the at least one processing resource 105 of computing device 100 to implement functionalities described herein in relation to instructions 121. Instructions 121 may include at least instructions 122, 124, 126, 128, and 129, which may be executable by the at least one processing resource 105 to perform functionalities as described herein. Computing device 100 may also comprise one or more storage devices (not shown) to persistently store data for computing device 100. In such examples, each of the storage device(s) may be a non-volatile storage device, such as a hard disk drive (HDD), a solid state drive (SSD) (such as a flash drive), or any other suitable device to store data in a non-volatile manner. The storage devices of computing device 100 may also comprise any combination of one or more of any such types of storage device(s).

In the example of FIG. 1, computing device 100 may comprise a source virtual volume tree 111 comprising at least a source base virtual volume 110 and one or more snapshot virtual volumes descending from source base virtual volume 110. In the example of FIG. 1, source virtual volume tree 111 includes source snapshot virtual volumes 210 and 310. In other examples, source virtual volume tree 11 may include more or fewer source snapshot virtual volumes. Source virtual volume tree 111 may be stored in the storage device(s) of computing device 100. Source virtual volume tree 111 may also comprise metadata 115 that provides information regarding the relationship(s) between virtual volumes in the virtual volume tree 111. In some examples, source virtual volume tree 111 may include snapshot metadata that tracks the snapshot relationships between the virtual volumes of the tree (e.g., via pointers or other similar metadata between extents of snapshot virtual volumes and extents of other virtual volumes). In some examples, this snapshot metadata is not directly copied from the source tree 111 to the target storage system 510, but instead may be reconstructed at the target storage system 510 (as described below in relation to FIGS. 4A-4D). Examples of a process to copy (or migrate) source virtual volume tree 111 to target storage system 510 are described below in relation to FIG. 1.

In the example of FIG. 1, instructions 122 may instruct 180 target storage system 501 to create an empty target virtual volume tree having a tree structure of source virtual volume tree 111 of source storage system 101. In examples described herein, the tree structure of a virtual volume tree may include the number of virtual volumes in the tree, the respective sizes of each of the virtual volume in the tree, the respective relationships between virtual volumes of the tree, and the like. For example, the tree structure of source virtual volume tree 111 may comprise three virtual volumes, including a base virtual volume 110, a snapshot virtual volume 210 that represents a snapshot of base virtual volume 110 (relationship), and a snapshot virtual volume 310 that represents a snapshot of snapshot virtual volume 210 (relationship). The relationships between the virtual volumes of a tree may be represented by metadata for the tree (such as metadata 115 of tree 111). Such metadata may also include other information about the structure of a virtual volume tree, such as the respective names of the virtual volumes, and the like.

In such examples, instructions 122 may instruct 180 target storage system 501 to create a target virtual volume tree 555 having the tree structure of source virtual volume tree 111, including, for example, three virtual volumes 130, 230, and 330 corresponding to and having the same volume names (e.g., "VVOL1", "SS1", "SS2") and worldwide names (WWNs) as virtual volumes 110, 210, and 310, respectively, and the same relationships between the virtual volumes as described above (e.g., as illustrated in part by metadata 115 and 515 in FIG. 1).

As described above, source virtual volume tree 111 comprises source base virtual volume 110 and source snapshot virtual volumes 210 and 310. In the example of FIG. 1, source virtual volume tree 111 comprises a plurality of extents E1, E2, etc., as described above, wherein each of the extents E1, E2, etc., corresponds to a different portion of an address space of source base virtual volume 110 (which address space is shared among all the virtual volumes of tree 111). For each of the plurality of extents E1, E2, etc., each of virtual volumes 110, 210, and 310 comprises (or otherwise represents) a respective version 101, 201, 301 of that extent. Although two extents E1, E2 of tree 111 are illustrated in FIG. 1, tree 111 may contain any suitable number of extents.

In some examples, a given extent of a virtual volume tree may be populated or not and may be allocated or not. For example, a given extent may be unallocated, such that, for example, no physical storage in storage devices of computing device 100 has been provisioned for that extent. In other examples, a given extent may be allocated (i.e., have physical storage provisioned for storage of data), but be unpopulated such that nothing has been written to that extent since it was provisioned. In other examples, a given extent may be both allocated and populated, such that physical storage has been provisioned for it, and data has been written to it. In examples described herein, a given extent version may be populated or not. For example, a "populated" extent version of a virtual volume is an extent version that includes data (e.g., host data from or written by a host) as opposed to a pointer to an extent version of another virtual volume, or neither data (e.g., host data) nor a pointer. In such examples, an "unpopulated" extent version of a virtual volume is an extent version that includes a pointer to an extent version of another virtual volume (as opposed to data), or neither data (e.g., host data) nor a pointer.

In the example of FIG. 1, instructions 122 may instruct 180 target storage system 501 to create a target virtual volume tree 555 having the tree structure of source virtual volume tree 111, including, for example, the same extents E1, E2, etc., as tree 111 (e.g., the same number of extents, the same sizes, and the like). Although only extent E1 is illustrated in FIG. 1, target virtual volume tree 555 may have the same plurality of extents as source virtual volume tree 111.

As noted above, instructions 122 may instruct 180 target storage system 501 to create an empty target virtual volume tree 555. In examples described herein, an "empty" virtual volume tree may be a virtual volume tree in which none of the extent versions of any of the virtual volumes of the tree are populated (e.g., with data from populated extents of a source virtual volume tree). Such an empty virtual volume tree may be described further herein in relation to FIG. 4A, for example. In the example of FIG. 1, target virtual volume tree 555 may be created on target storage system 501 with no extent versions (including 101, 201, and 301) of target virtual volumes 130, 230, and 330, respectively, being populated. Instead they may be empty (or null) or contain pointers, for example.

In some examples (e.g., when performing a migration process), an access path for each of the virtual volumes of the target virtual volume tree 555 (e.g., target base virtual volume 130 and target snapshot virtual volumes 230 and 330) may be set to an asymmetric logical unit access (ALUA) standby state. In such examples, the access path to the virtual volumes of tree 555 may be maintained in the ALUA standby state during the copy or migration process (e.g., while compressed extent collections are provided to target storage system 501), as described further below, so that host(s) are not able to perform IO directly on the virtual volumes of tree 555. In such examples, the virtual volumes of tree 555 of target storage system 510 may be exported to the host(s) via an access path set to the ALUA standby state. In this manner, the copy or migration process may maintain control over access to the virtual volumes of the target tree 555 and may thereby maintain coherency of the volumes of the tree 555. In some examples, instructions of target system 501 (e.g., instructions stored on storage medium 520) may set the access path to the virtual volumes of tree 555 to the ALUA standby state. In other examples, instructions of source system 101 (e.g., instructions stored on storage medium 120) may set the access path to the virtual volumes of tree 555 to the ALUA standby state. In other examples, another computing device (e.g., a separate appliance) may set the access path to the virtual volumes of tree 555 to the ALUA standby state.

Referring again to source virtual volume tree 111 of FIG. 1, for extent E1, source base virtual volume 110 comprises an extent version 101 that is populated with data (e.g., host data received by source storage system 101 as part of a write from a host system). In the example of FIG. 1, for extent E1, source snapshot virtual volume 210 comprises an extent version 101 that is populated with data, and source snapshot virtual volume 310 comprises an extent version 301 that is populated with data.

In the example of FIG. 1, extent version 101 is populated because data has been written to source base virtual volume 110 at extent E1, and extent versions 201 and 301 are populated because they are each preserving data from when respective snapshots were taken (e.g., due to copy-on-write or other snapshot data preserving operations). For example, after source base virtual volume 110 was initially created, a first set of data "A" may have been written to extent E1 to form extent version 101 (including data "A"). Thereafter, a snapshot may have been taken, which created source snapshot virtual volume 210, which, for extent E1, initially had a pointer to extent version 101 as extent version 201. When copy-on-write is being used, a subsequent write operation to source base virtual volume 110 at extent E1 may cause the data "A" of extent version 101 to be copied to source snapshot virtual volume 210 at extent E1. In such examples, the pointer of extent version 201 is then replaced with data "A" in extent version 201 (i.e., the data that the pointer was previously pointing to). After copying data "A" to extent version 201, the write operation may be performed to write to extent version 101, potentially changing some or all of data "A" (which may then be referred to herein as data "B").

In a similar manner, in a case where a snapshot of virtual volume 210 was taken to generate source snapshot virtual volume 310, extent version 301 may not have be populated initially, instead including a pointer to extent version 201. A subsequent write operation to virtual volume 210 at extent E1 may cause a copy-on-write process (for example) to copy data "A" (preserved in extent version 201) to extent version 301 (which would then become populated with data "A"), and may then perform the write operation to virtual volume 210 at extent E1, which may change some or all of data "A" of extent version 201 (which may then be referred to as data "C"). In accordance with such examples described above, various extent versions of a given extent of a virtual volume tree may become populated over time, and at any given time some extent versions of an extent may be populated, and others may not be populated.

In the example of FIG. 1, for each of multiple different extents of the plurality of extents E1, E2, etc., of source virtual volume tree 111, instructions 124 may identify each version of the extent that is populated with data among the source base and source snapshot virtual volumes 110, 210, and 310. For example, for each extent of tree 111, instructions 124 may identify each populated extent version among the virtual volumes of the tree 111. In such examples, in the example of FIG. 1, for extent E1, instructions 124 may identify each of extent versions 101, 201, and 301 as populated extent versions for extent E1, since each include data (e.g., host data) as opposed to a pointer to another virtual volume or no data. In such examples, for extent E2, instructions 124 may identify each of extent versions 102 and 202 as populated extent versions for extent E2, since each include data in the example of FIG. 1, and may not identify extent version 302 as populated, as it includes a pointer to extent version 202 of virtual volume 210 in the example of FIG. 1. In the figures of the present application, extent versions comprising pointers are illustrated by dot and arrow elements (see, e.g., 302) and extent versions comprising data are illustrated by labeled blocks.

In the example of FIG. 1, for each of multiple different extents of the plurality of extents E1, E2, etc., of source virtual volume tree 111, instructions 126 may compress the identified, populated versions of the extent relative to one another, such that the compression is performed exclusively over identified, populated versions of the same extent from the source base and source snapshot virtual volumes 110, 210, and 310. In this manner, instructions 126 may generate a respective compressed extent collection for each of the multiple different extents, each including a compressed representation of the identified versions of the extent.

For example, in the example of FIG. 1, for extent E1 of source virtual volume tree 111, instructions 126 may compress the identified, populated versions 101, 201, and 301 of extent E1 relative to one another (such that the compression is performed exclusively over versions of the single extent E1) to generate a compressed extent collection 401 including a compressed representation of the identified versions

101, 201, 301 of the extent E1. By performing compression exclusively over versions of a single extent E1, a relatively high compression ratio may be achieved for the volumes when populated versions are compressed relative to one another, which may make the copy or migration process more efficient, as described above.

As another example, in the example of FIG. 1, for extent E2 of source virtual volume tree 111, instructions 126 may compress the identified, populated versions 102 and 202 of extent E1 relative to one another (such that the compression is performed exclusively over versions of the single extent E2) to generate a compressed extent collection including a compressed representation of the identified versions 102 and 202 of extent E2. In some examples, instructions 126 may compress extent versions from one extent relative to one another and not relative to data from any other extent.

In the example of FIG. 1, for each of the extents E1, E2, etc., of source virtual volume tree 111, instructions 128 may provide the respective compressed extent collection to target storage system 501 via a communication channel. For example, instructions 128 may provide compressed extent collection 401 for extent E1 to target storage system 501, and may provide the compressed extent collection for extent E2 (including a compressed representation of the identified versions 102 and 202) to target storage system 501. For example, instructions 128 may provide. In such examples, target storage system 501 may receive the provided compressed extent collections to populate extents of the target virtual volume tree 555, as described in more detail below.

In some examples, instructions 128 may provide location information 182 to target storage system 501 via the communication channel. In such examples, the location information may indicate where the identified versions of the multiple different extents are to be stored among the target base and target snapshot virtual volumes 130, 230, and 330. In examples described herein, location information 128 may be represented in any suitable manner and may be provided in any suitable manner. For example, location information 182 may be a collection of information, provided once to target storage system 501 during the copy or migration process, that indicates the format of compressed extent collections, such that the target storage system may determine, from the format of the compressed extent collection (or a decompressed version thereof, for example), which provided extent versions are to be stored to which of the target virtual volume(s), respectively. Further, the compressed extent collections may be provided in an order such that the target system 501 may determine the extent at which to store the extent versions provided in a given compressed extent collection (e.g., based on the order in which they are received). In such examples, the location information 182 may be provided separately from any compressed extent collection.

In other examples, the location information 182 may identify, for each of the identified versions of the multiple different extents, a location in the address space at which to store the identified version of the extent in one of the target base and the target snapshot virtual volumes of tree 111. In such examples, a respective instance of location information 182 may be provided to target storage system 501 for each compressed extent collection provided to target storage system 501, either with or separate from the respective compressed extent collections. In such examples, each instance of location information 182 may identify, for each of the populated and identified extent versions of a given extent, one or more of (i) a virtual volume in which to store the extent version among the target base and target snapshot virtual volumes, and (ii) a location in the address space at which to store the extent version. In other examples, the location information 182 may be implemented and provided in any other suitable manner.

In some examples, instructions 128 may provide each compressed extent collection to target storage system 501 with a maintenance write flag 410 to cause target storage system 510 to write the extent versions represented in the provided compressed extent collection to the target base and target snapshot virtual volumes 130, 230, and 330 via a maintenance write process of the target storage system (e.g., of instructions 529, as described below). The maintenance write flag 410 may be implemented in any suitable manner or represented by any suitable data representation (e.g., a "1" in a designated location, etc.). In such examples, the maintenance write process is a write process does not perform snapshot data preservation operations, such as copy-on-write or redirect-on-write (as described above), based on overwrites and that is able to write to read-only snapshots. Examples of the maintenance write process are described in more detail below in relation to instructions 529. By writing extent versions to the virtual volumes of tree 555 via a maintenance write process that does not perform snapshot data preservation based on overwrites, examples described herein may perform a process of writing extent versions to the target tree 555 without corrupting otherwise compromising the consistency of the data as it is copied to tree 555 (e.g., by performing a copy-on-write that places a given extent in a different state than in the source tree). In this manner, examples described herein may perform a process of writing extent versions to the target tree 555 in a way that preserves the time sequence in which the snapshots were created and writes were performed relative to those snapshots at the source storage system. Examples described herein may also perform this process of writing extent versions to the target tree 555 at the same time as replicating host writes to the target tree 555 while the source tree 111 is online.

In some examples, instructions 128 may provide the respective compressed extent collections for the plurality of extents of tree 111 to target storage system 501 while one or more of the source base virtual volume 110 and the source snapshot virtual volumes 210 and 310 are online to service host IO requests (e.g., read and write requests), as described above. For example, source storage system 101 may receive (via a communication channel) a host write request 184 from a host (e.g., a request from a host computing device separate from system 102) to write to (i.e., targeting) source base virtual volume 110, during the time period in which instructions 128 are providing the compressed extent collections to target storage system 501.

In such examples, in response to receiving the host write request 184, instructions 129 may replicate 186 the host write request 184 to target storage system 501 (e.g., to target base virtual volume 130), during the time period in which instructions 128 are providing the compressed extent collections to target storage system 501. In such examples, instructions 129 may replicate 186 the host write request 184 by forwarding a copy of the host write request 184 to target storage system 501 (via a communication channel), or repackaging the request in any suitable way for provision to the target storage system 501.

In some examples, in response to receiving the host write request 184, instructions 129 may detect the copy or migration relationship between the source tree 111 and the target tree 555 of target storage system 501, and based on that relationship, instructions 129 may replicate 186 the host write request 184 to the target storage system 501 (e.g., to the target base virtual volume 130). Instructions stored on storage medium 120 may also perform the write to the source base virtual volume 110 based on host write request 184. As described above, such a host write request 184 may be performed at source storage system 101 and may be replicated to target storage system 501, regardless of where the copy or migration process is in performing the copying or migration.

In some examples, instructions 129 may provide the replicated host write request 186 to target storage system 501 without any maintenance write flag. In such examples, the absence of the maintenance write flag (e.g., maintenance write flag 410) may cause target storage system 501 to perform the replicated write request 186 to the target base virtual volume 130 via a host write process of target storage system 501 (e.g., implemented by instructions 527, for example) that performs snapshot data preservation (e.g., copy-on-write, redirect-on-write, or the like) based on overwrites. By performing the host write via a process that performs such snapshot data preservation, the host write may maintain the state of each of the snapshots when there is, for example, a first overwrite to a volume after a snapshot of that volume is taken.

In some examples (e.g., when performing a migration process), after the compressed extent collections for the extents of tree 111 are provided to target storage system 501, an access path for the source base and source snapshot virtual volumes 110, 210, 310 may be set to the ALUA standby state (so that host(s) are not able to perform IO directly on the virtual volumes of tree 111), and an access path for the target base and target snapshot virtual volumes 130, 230, and 330 may be set to an ALUA active state (so that host(s) are able to perform IO directly on the virtual volumes of tree 555). In such examples, after the compressed extent collections for the extents of tree 111 are provided to target storage system 501, the states of access paths may be updated such that the target tree 555 becomes the active tree. In some examples, instructions of target system 501 (e.g., instructions stored on storage medium 520) may change the ALUA states of the access paths as described above (e.g., set the access path for the source base and source snapshot virtual volumes 110, 210, 310 to the ALUA standby state, and set the access path for the target base and target snapshot virtual volumes 130, 230, and 330 to an ALUA active state), after the compressed extent collections for the extents of tree 111 are provided to target storage system 501. In other examples, instructions of source system 101 (e.g., instructions stored on storage medium 120) may change the ALUA states of the access paths as described above after the compressed extent collections for the extents of tree 111 are provided to target storage system 501. In other examples, another computing device (e.g., a separate appliance) may change the ALUA states of the access paths as described above after the compressed extent collections for the extents of tree 111 are provided to target storage system 501.

Continuing to refer to the example of FIG. 1, examples of a copy or migration process from the perspective of the target storage system 501 is described below. As noted above, target storage system 501 may comprise a computing device 500. Computing device 500 may comprise at least one processing resource 505 (which may be referred to herein as a "target" processing resource 505) and at least one machine-readable storage medium 520 comprising (e.g., encoded with) at least target copy instructions 521 that are executable by the at least one processing resource 505 of computing device 500 to implement functionalities described herein in relation to instructions 521. Instructions 521 may include at least instructions 522, 524, 526, 527, 528, and 529, which may be executable by the at least one processing resource 505 to perform functionalities as described herein. Computing device 500 may also comprise one or more storage devices (not shown) to persistently store data for computing device 500. In such examples, the storage device(s) may be a non-volatile storage device(s), such as any combination of one or more HDDs, one or more SSDs, or one or more of any other suitable device to store data in a non-volatile manner.

In the example of FIG. 1, target copy instructions 521 are executable to perform a target copy creation process, including some or all of the functions described below in relation to instructions 522, 524, 526, 527, 528, and 529. In the example of FIG. 1, instructions 522 may create target virtual volume tree 555 on target storage system 501 (e.g., in response to the instruction 180 from source storage system 101 to create the target virtual volume tree). As described above, the target virtual volume tree 555 may comprise a target base virtual volume (e.g., virtual volume 130) and target snapshot virtual volumes (e.g., virtual volumes 230 and 330) and may having a tree structure of source virtual volume tree 111, as described above, and may include metadata 515 as a copy of metadata 115.

As described above, the source virtual volume tree comprises a plurality of extents E1, E2, etc., and source base and snapshot virtual volumes 110, 210, 310 each represent respective versions of the plurality of extents (each extent corresponding to a different portion of an address space of source base virtual volume 110). In such examples, instructions 522 may create target virtual volume tree 555 with the same plurality of extents. Instructions 522 may create target virtual volume tree 555 empty initially, such that none of the extent versions of any of the virtual volumes of tree 555 are populated with data, as described above (see also FIG. 4A).

In the example of FIG. 1, instructions 524 may receive (via a communication channel) a plurality of compressed extent collections (e.g., compressed extent collection 401, etc.), each comprising a compressed representation of multiple populated versions of a single extent from the source base and snapshot virtual volumes. As described above, the multiple populated versions of a compressed extent collection may be compressed relative to one another. In such examples, for each received compressed extent collection, instructions 526 may decompress the compressed extent collection to obtain decompressed versions of a single extent of source virtual volume tree 111, and instructions 528 may store the decompressed versions of the single extent in the target base and snapshot virtual volumes 130, 230, 330 via a maintenance write process (e.g., of instructions 529) that does not perform snapshot data preservation based on overwrites, as described above. In some examples, instructions 524 may receive (via the communication channel) location information 182 (implemented in any suitable manner as described above), and instructions 528 may store decompressed versions of extents in the appropriate locations of target base and snapshot virtual volumes 130, 230, 330, based on the received location information 180.

While the target copy instructions 521 may perform the above for each received compressed extent collection, an example of performing these functionalities for one compressed extent collection is described below for clarity. In the example of FIG. 1, instructions 524 may receive compressed extent collection 401 (described above), and in response, instructions 526 may decompress the compressed representation of the identified versions 101, 201, 301 of extent E1 included in the compressed extent collection 401. In some examples, instructions 528 may determine that compressed extent collection 401 is provided with (e.g., includes) a maintenance write flag 410 and, in response, instructions 529 may write the decompressed extent versions 101, 201, 301 to the target base and target snapshot virtual volumes 130, 230, and 330, respectively, via a maintenance write process, as described above. In examples described herein, the maintenance write process performed by instructions 529 is a process to write to various virtual volumes that (i) is able to write to read-only snapshot virtual volumes, and (ii) does not perform snapshot data preservation (e.g., copy-on-write, redirect-on-write, or the like) based on overwrites, as described above. In this manner, instructions 521 are able to perform the target copy creation process such that target storage system is able to apply each extent version directly to the appropriate member virtual volume of the target virtual volume tree, such that those writes do not trigger copy-on-write, redirect-on-write, or the like, based on overwrites (e.g., in response to a first overwrite at a given location of a virtual volume after a snapshot of the virtual volume was taken). In the example of FIG. 1, the writing of the extent versions 101, 201, and 301 to extent E1 of virtual volumes 130, 230, and 330, respectively, is shown by illustrating extent versions 101, 201, and 301 in the target tree 555 in bold.

As described above, source storage system 101 may provide a replicated host write 186 to target storage system 501, and the replicated host write 186 may not have the maintenance write flag 410. In such examples, instructions 521 may determine that the replicated host write 186 does not have the maintenance write flag 410 and, in response, instructions 527 may write data included in replicated host write 186 request to target base virtual volume 130 via a host write process (implemented by instructions 527, or other instructions separate from target copy instructions 521, for example) that performs snapshot data preservation based on overwrites.

In examples described herein, snapshot data preservation may include any type of functionality to preserve data of a snapshot when the volume of which the snapshot is taken it written to. For example, snapshot data preservation may include copy-on-write functionality, redirect-on-write functionality, or the like. The host write process may perform snapshot data preservation based on overwrites, e.g., in response to a first overwrite at a given location of a virtual volume after a snapshot of the virtual volume was taken. In such examples, instructions 529 may implement the maintenance write process such that is does not perform copy-on-write or redirect-on-write based on overwrites, and instructions 527 may implement the host write process such that it performs copy-on-write or redirect-on-write based on overwrites.

In some examples, instructions 521 may create snapshot metadata for the target virtual volume tree 555 that is the same as snapshot metadata for the source virtual volume tree 111, based on the received compressed extent collections and the received location information 182, as described in more detail below in relation to FIGS. 4A-4D. In examples described herein, for extent versions of the target virtual volume tree 555 that are not populated, the snapshot metadata comprises pointers to respective populated extent versions.

Although examples have been described herein in relation to copying or migrating a source virtual volume tree between separate storage systems, techniques of examples described herein may be used to copy or migrate virtual volume trees between source and target storage systems implemented within a single computing device (e.g., storage array), a single hyperconverged system, or a single SDS system, or the like, or to copy or migrate virtual volume trees within a single storage system, such as, for example, a single storage array (or other computing device), a hyperconverged system, an SDS system, or the like. In other examples, techniques of examples described herein may be used to copy or migrate virtual volume trees to perform an initial synchronization in advance of providing continuous active/active access to the virtual volume tree on both the source and target storage systems. Although examples have been described herein in relation to functionalities performed by execution of source copy instructions 121 of source storage system 101 and by execution of target copy instructions 521 of target storage system 501, in other examples, any or all of these functionalities may be performed by a system separate from source storage system 101 and target storage system 501, or by a single storage system (e.g., in a system to perform such copy or migration within the single storage system, as described above). For example, the separate system may comprise one or more computing device(s) each comprising one or more machine-readable storage medium comprising instructions executable to perform any or all of the functionalities described above in relation to instructions 121 and 521, or any combination thereof. In other examples, any or all of the functionalities described herein in relation to source copy instructions 121 and target copy instructions 521 may be performed by a single storage system (e.g., comprising instructions to execute those functionalities) to copy or migrate a virtual volume tree within the single storage system, for example.

Figure 2:
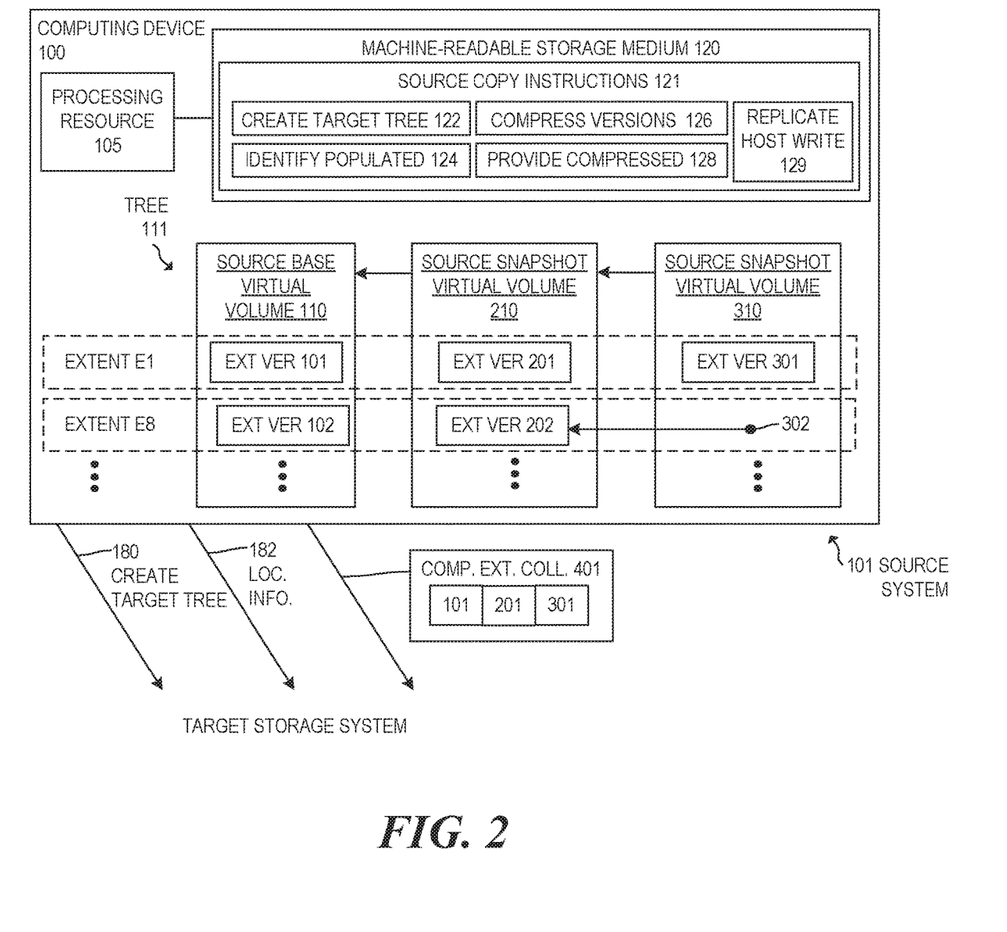
FIG. 2 is a block diagram of an example source storage system to compress identified versions of an extent relative to one another.

FIG. 2 is a block diagram of an example source storage system 101 to compress identified versions of an extent relative to one another. In the example of FIG. 2, the source storage system 101 may comprise a computing device 100, as described above in relation to FIG. 1, including processing resource 105, storage medium 120 comprising instructions 121, and storage device(s) storing source virtual volume tree 111, as described above in relation to FIG. 1. The example of FIG. 2 will be described herein in relation to FIG. 3, which is a flowchart of an example method 600 that includes providing compressed extent collections to a target storage system.

Although execution of method 600 is described below with reference to source storage system 101 of FIG. 2, other systems suitable for the execution of these methods may be utilized (e.g., storage system 101 of FIG. 1, or a storage system to copy or migrate a virtual volume tree internally). Additionally, implementation of these methods is not limited to such examples. Although the flowchart of FIG. 2 shows a specific order of performance of certain functionalities, the methods are not limited to that order. For example, the functionalities shown in succession in the flowcharts may be performed in a different order, may be executed concurrently or with partial concurrence, or a combination thereof (particularly 625, which may be performed before, after, or concurrent with any of 610-620).

Figure 3:
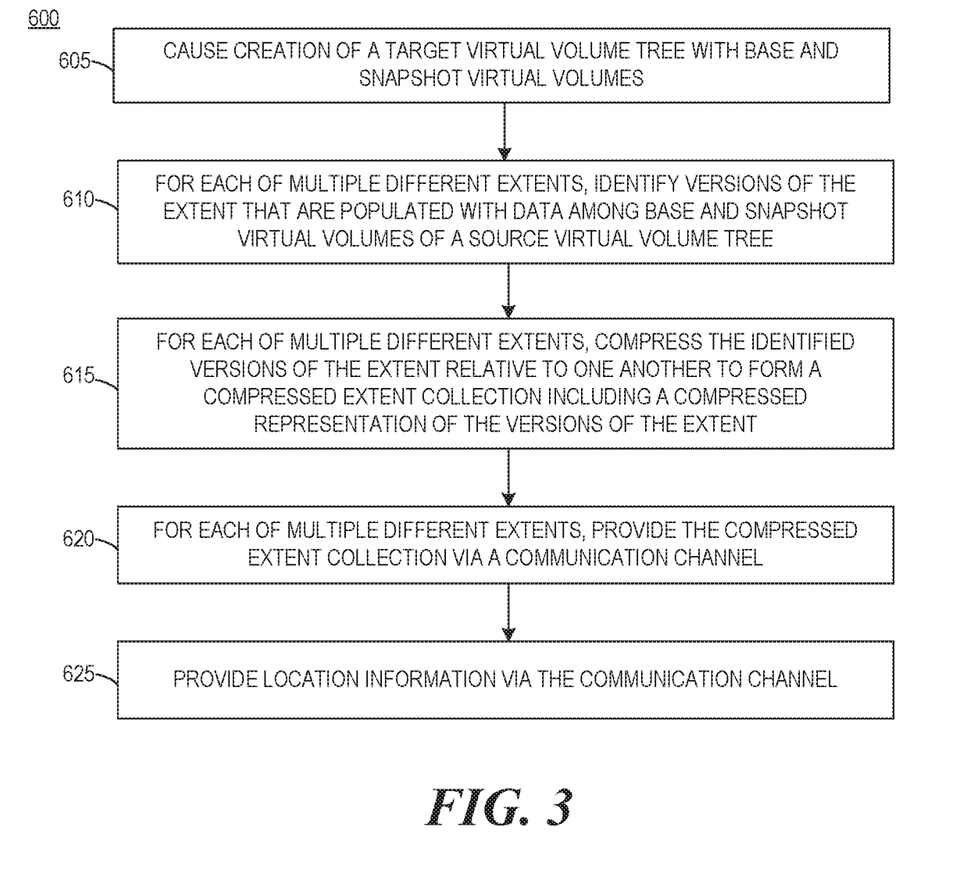
FIG. 3 is a flowchart of an example method that includes providing compressed extent collections to a target storage system.

Referring to FIGS. 2 and 3, at 605 of method 600, instructions 122 of computing device 100 (e.g., when executed by processing resource 105) may cause creation of an empty target virtual volume tree having a tree structure of a source virtual volume tree 111. For example, instructions 122 may instruct a target storage system (e.g., system 501 of FIG. 1) to create an empty target virtual volume tree having a tree structure of source virtual volume tree 111 of source storage system 101. As described above, the source virtual volume tree 111 may comprise source base and source snapshot virtual volumes 110, 210, 310, each representing respective versions of a plurality of extents E1, E2, etc., wherein each of the extents E1, E2, etc., corresponds to a different portion of an address space of the source base virtual volume 110.

At 610, for each of multiple different extents of tree 111, instructions 124 may (e.g., when executed by processing resource 105) identify each version of the extent that is populated with data among the source base and source snapshot virtual volumes 110, 210, 310, as described above. At 615, for each of multiple different extents of tree 111, instructions 126 may (e.g., when executed by processing resource 105) compress the identified versions of the extent relative to one another, such that the compression is performed exclusively over versions of the same extent from the source base and source snapshot virtual volumes 110, 210, 310, to generate a compressed extent collection including a compressed representation of the identified versions of the extent, as described above.

At 620, for each of multiple different extents of tree 111, instructions 128 may (e.g., when executed by processing resource 105) provide the compressed extent collection via a communication channel. For example, instructions 128 may provide the compressed extent collection to the target storage system, as described above, via the communication channel. In some examples, instructions 128 may provide each compressed extent collection 401 via the communication channel (e.g., to the target storage system) with a maintenance write flag to cause the target storage system to write the extent versions represented in the compressed extent collection to the target base and target snapshot virtual volumes via a maintenance write process of the target storage system that does not perform copy-on-write or redirect-on-write based on overwrites. At 625, instructions 128 may provide, via the communication channel (e.g., to the target storage system), location information 182 to indicate where the identified versions of the multiple different extents are to be stored among the target base and target snapshot virtual volumes, as described above.

Figure 4A:
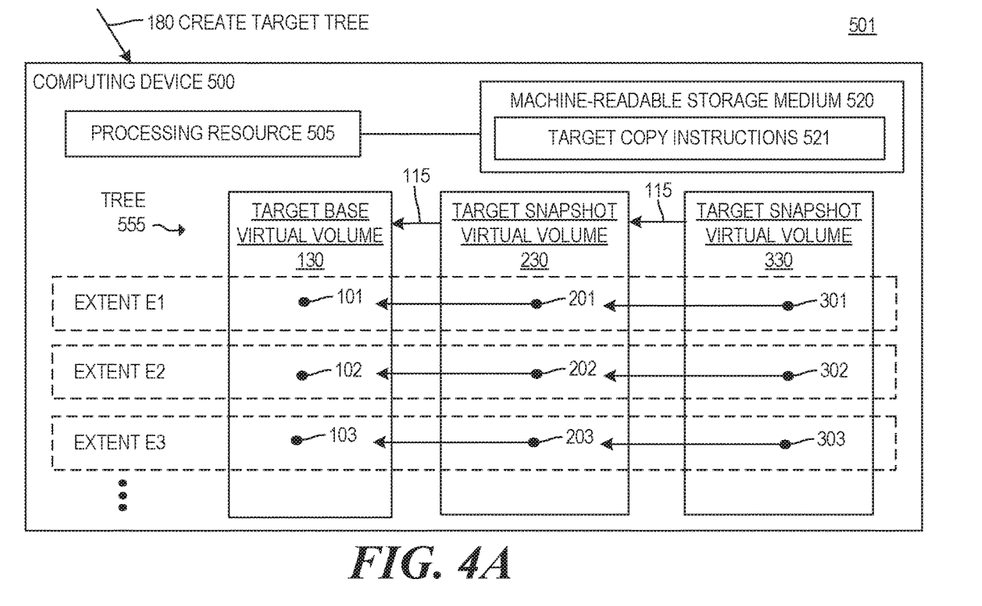
FIG. 4A is a block diagram of an example target storage system to create a target virtual volume tree.
Figure 4B:
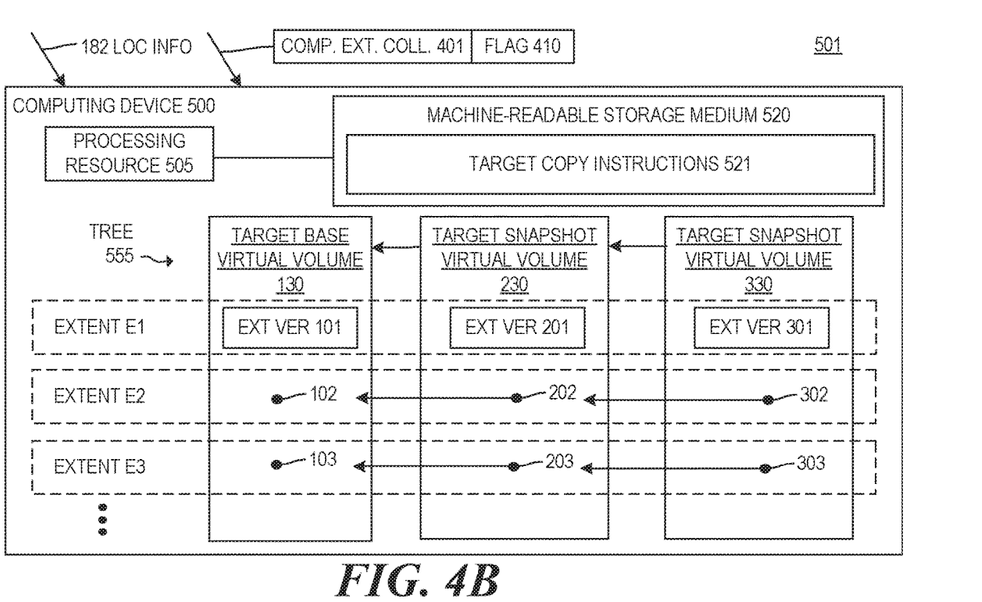
FIG. 4B is another block diagram of the example target storage system of FIG. 4A, with decompressed extent versions stored to the target virtual volume tree.
Figure 4C:
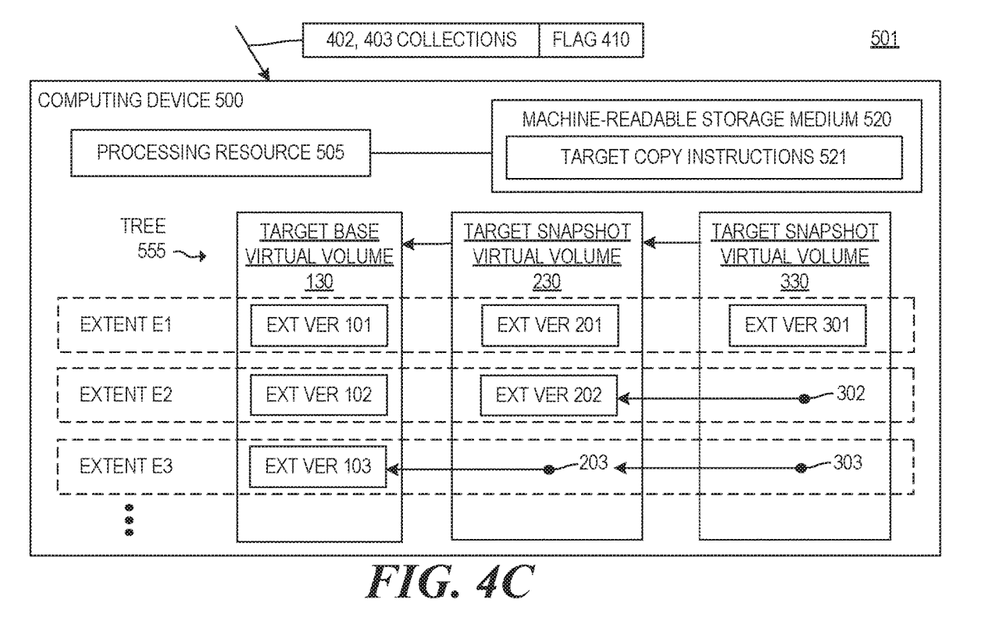
FIG. 4C is another block diagram of the example target storage system of FIG. 4A, with decompressed extent versions of multiple compressed extent collections stored to the target virtual volume tree.
Figure 4D:
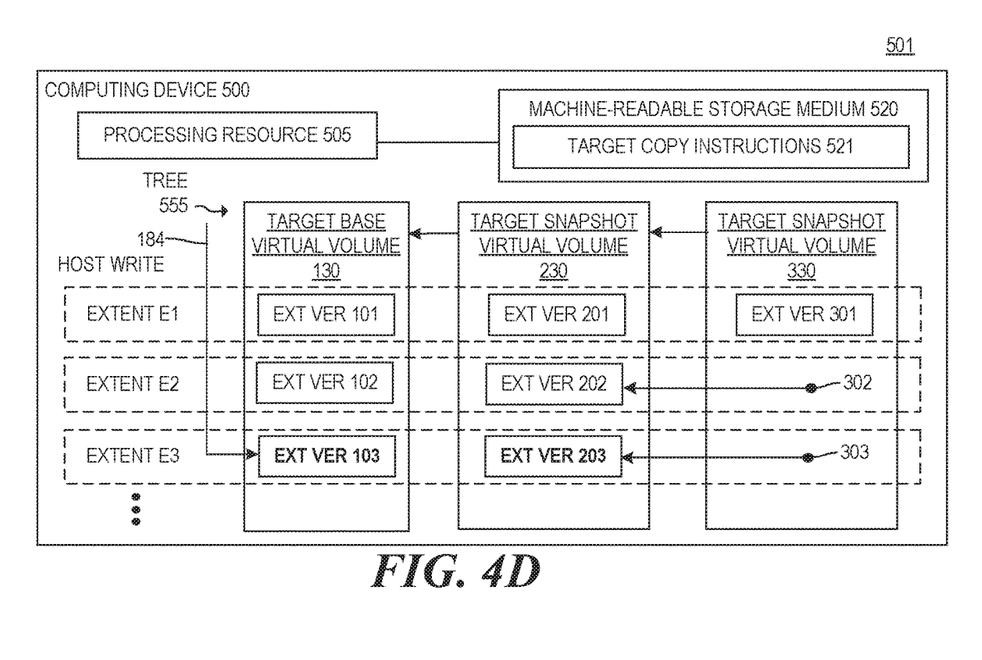
FIG. 4D is another block diagram of the example target storage system of FIG. 4A, illustrating an example of processing a replicated host write to the target virtual volume tree.
Figure 5:
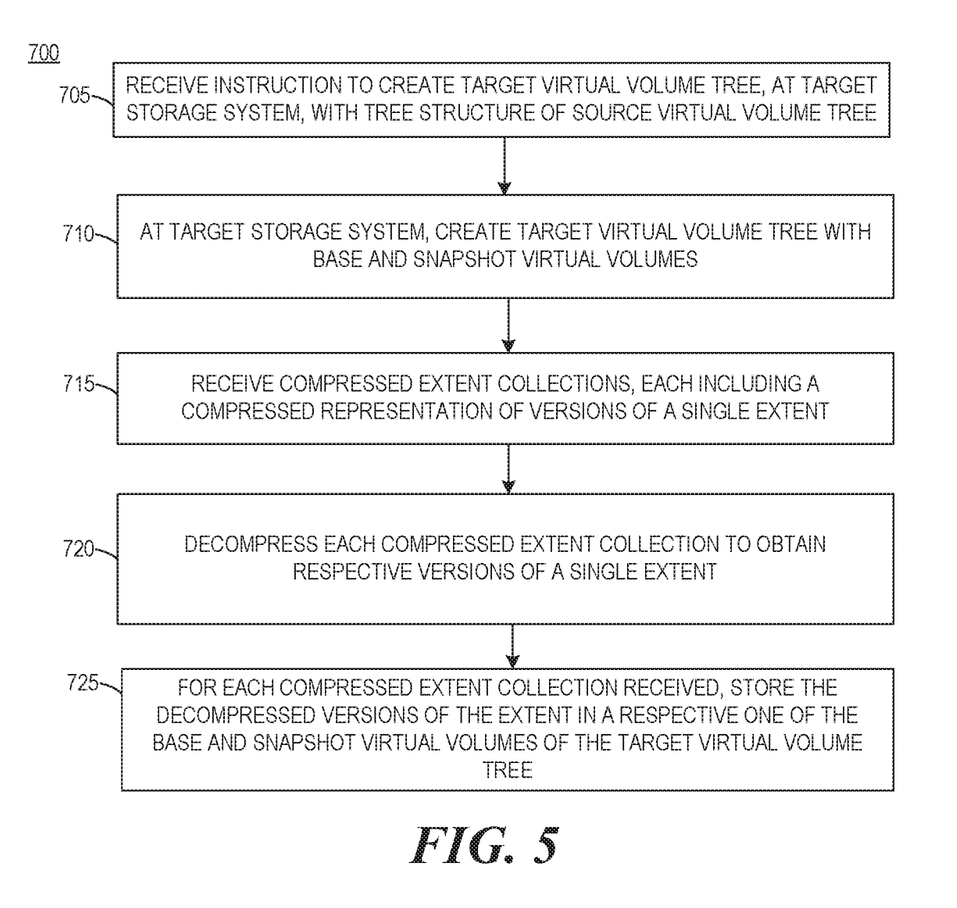
FIG. 5 is a flowchart of an example method that includes decompressing compressed extent collections to obtain respective versions of a single extent.

Examples of how snapshot metadata of source virtual volume tree 111 of source storage system 101 may be reconstructed at the target storage system 510 for target virtual volume tree 555 will be described below in relation to FIGS. 4A-4D and 5. FIG. 4A is a block diagram of an example target storage system 501 to create a target virtual volume tree 555. FIG. 4B is another block diagram of the example target storage system 501 of FIG. 4A, with decompressed extent versions stored to the target virtual volume tree 555. FIG. 4C is another block diagram of the example target storage system 501 of FIG. 4A, with decompressed extent versions of multiple compressed extent collections stored to the target virtual volume tree 555. FIG. 4D is another block diagram of the example target storage system 501 of FIG. 4A, illustrating an example of processing a replicated host write to the target virtual volume tree 555. FIG. 5 is a flowchart of an example method 700 that includes decompressing compressed extent collections to obtain respective versions of a single extent.

In the examples of FIGS. 4A-4D, the source storage system 501 may comprise a computing device 500, as described above in relation to FIG. 1, including processing resource 505, storage medium 520 comprising instructions 521 (including instructions 522, 524, 526, 527, 528, and 529, as described above), and storage device(s) storing target virtual volume tree 555, as described above in relation to FIG. 1. Although execution of method 700 is described below with reference to target storage system 501 of FIGS. 4A-4D, other systems suitable for the execution of these methods may be utilized (e.g., storage system 501 of FIG. 1). Additionally, implementation of these methods is not limited to such examples. Although the flowchart of FIG. 5 shows a specific order of performance of certain functionalities, the methods are not limited to that order. For example, the functionalities shown in succession in the flowcharts may be performed in a different order, may be executed concurrently or with partial concurrence, or a combination thereof.

Referring to FIGS. 4A and 5, at 705 of method 700, instructions 521 (e.g., instructions 522 of instructions 521) of computing device 500 (e.g., when executed by processing resource 505) may receive an instruction 180 from source storage system 101 to create a target virtual volume tree 555 having the tree structure of a source virtual volume tree 111 (see FIG. 1) of a source storage system 101 (see FIG. 1). At 710, in response to instruction 180, instructions 521 may create a target virtual volume tree 555 having the tree structure of source virtual volume tree 111 (see FIG. 1), as described above. For example, instructions 521 may create a target virtual volume tree 555 having including three virtual volumes 130, 230, and 330 corresponding to and having the same names (e.g., "VVOL1", "SS1", "SS2") as virtual volumes 110, 210, and 310, respectively, and the same relationships between the virtual volumes as described above (e.g., as illustrated in part by metadata 115).

In some examples, the source storage system 101 may instruct 180 target storage system 501 to create an empty target virtual volume tree 555, in which none of the extent versions of any of the virtual volumes of the tree are populated, as illustrated in FIG. 4A. In such examples, instructions 522 may create target virtual volume tree 555 with no extent versions of target virtual volumes 130, 230, and 330, respectively, being populated. Instead they may be empty (or null) or contain pointers, for example. For example, as illustrated in FIG. 4A, in the empty virtual volume tree 555, target base virtual volume 130 may include no populated extent versions, instead including empty or null extent versions 101, 102, 103, etc. In such examples, snapshot virtual volume 230 may include no populated extent versions, instead including pointers to the base virtual volume 130 as extent versions, including an extent version 201 pointing to extent version 101 of virtual volume 130, an extent version 202 pointing to extent version 102 of virtual volume 130, an extent version 203 pointing to extent version 103 of virtual volume 130, etc. In such examples, snapshot virtual volume 330 may also include no populated extent versions, instead including pointers to the snapshot virtual volume 330 as extent versions, including an extent version 301 pointing to extent version 201 of virtual volume 230, an extent version 302 pointing to extent version 202 of virtual volume 230, an extent version 303 pointing to extent version 203 of virtual volume 230, etc. In such examples, instructions 521 may reconstruct the snapshot metadata of source virtual volume tree 111 of the source storage system 101, as described below in relation to FIGS. 4B and 4C.

For example, to create snapshot metadata for target virtual volume tree 555 (i.e., to re-create the snapshot metadata of source virtual volume tree 111), instructions 521 may create the target virtual volume tree 555 such that, before receiving any of the compressed extent collections, each extent version of the target base virtual volume is unpopulated, and each extent version of each target snapshot virtual volume comprises a pointer to another version of the same extent in the target base or another target snapshot virtual volume, as described above and illustrated in relation to FIG. 4A. in such examples, instructions 521 may continue to create the snapshot metadata through the process of storing decompressed extent versions in the virtual volumes of tree 555, as described below, which may remove the pointer of any extent version for which a decompressed extent version is stored to a target snapshot virtual volume.

Referring to FIGS. 4B-4C and 5, at 715 of method 700, instructions 521 may receive a plurality of compressed extent collections, as described above, each compressed extent collection comprising a compressed representation of multiple populated versions of a single extent from the source base and snapshot virtual volumes, in which the multiple populated versions compressed relative to one another. In such examples, at 720, for each received compressed extent collection, instructions 521 may decompress the compressed extent collection to obtain decompressed versions of a single extent of the source virtual volume tree, and at 725 instructions 521 may store the decompressed versions of the single extent in the target base and snapshot virtual volumes 130, 230, 330, via a maintenance write process that does not perform snapshot data preservation based on overwrites, as described above.

In some examples, instructions 521 may also receive location information 182 for the compressed data collections in any suitable form, as described above. In such examples, instructions 521 may, for each of the received compressed data collections, store each of the versions of the extent of the compressed extent collection in a respective one of the target base and target snapshot virtual volumes 130, 230, and 330, based on the received location information 182 (that may in whole or in part indicate where to store each of the received extent versions in the tree 555). As described above, instructions 521 may write each extent version received as part of a compressed extent collection, to a respective one of the target base and target snapshot virtual volumes 130, 230, 330, via a maintenance write process of instructions 521 of target storage system 501, wherein the maintenance write process does not perform copy-on-write, redirect-on-write, or other snapshot data preservation operations based on overwrites and is permitted to write to read-only snapshots, as described above.

As an example, referring to FIG. 4B, instructions 521 may receive a compressed extent collection 401 with a maintenance write flag 410, and may receive location information 182, each as described above in relation to FIG. 1. In such examples, instructions 521 may decompress compressed extent collection 401 to obtain decompressed versions 101, 201, 301 of single extent E1 of source virtual volume tree 111. In such examples, instructions 521 may store decompressed extent version 101 in target base virtual volume 130 (replacing null extent version 101), store decompressed extent version 201 in target base virtual volume 230 (replacing pointer extent version 201), and store decompressed extent version 301 in target base virtual volume 330 (replacing pointer extent version 301), each via the maintenance write process in response to the presence of flag 410, as described above. In such examples, instructions 521 may store the decompressed extent versions to the appropriate virtual volumes and extent based on the location information 182.

Continuing the example above, referring to FIG. 4C, instructions 521 may receive a compressed extent collections 402 and 403, each with a maintenance write flag 410. In such examples, instructions 521 may decompress compressed extent collection 402 to obtain decompressed extent versions 102, 202 of single extent E2 of source virtual volume tree 111. In such examples, instructions 521 may store decompressed extent version 102 in target base virtual volume 130 (replacing null extent version 102), and store decompressed extent version 202 in target base virtual volume 230 (replacing pointer extent version 202), each via the maintenance write process. Instructions 521 may decompress compressed extent collection 403 to obtain, for example, a decompressed extent version 103 of a single extent E3 (not shown) of source virtual volume tree 111. In such examples, instructions 521 may store decompressed extent version 103 in target base virtual volume 130 (replacing null extent version 103). In such examples, instructions 521 may store the decompressed extent versions to the appropriate virtual volumes and extent based on the location information 182 (either the same location information 182, or additional location information 182).

In such examples, this process may continue for all compressed extent collections, and once all compressed extent collections have been decompressed and the extent versions written to the appropriate target virtual volumes, then the snapshot metadata of source virtual volume tree 111 will have been re-created in target virtual volume tree 555, in some examples. In such examples, the snapshot metadata may include, for each unpopulated extent version in any of the one or more target snapshot virtual volumes 130, 230, 330, a link (e.g., pointer) from the unpopulated extent version to another version of the same extent (e.g., a pointer 302 to extent version 202, a pointer 203 to extent version 103, etc.).

In some examples, during a time in which compressed extent collections are being received by target storage system 501, instructions 521 may receive and process a replicated host write request, as illustrated in the example of FIG. 4D. in the example of FIG. 4D, the virtual volume tree copy process may proceed by extents and may have completed the copying of at least extents E1, E2, and E3, as illustrated in FIG. 4C. In such examples, instructions 521 may receive, from source storage system 111, a replicated host write request 184 that replicates a host write request targeting the source virtual volume tree (e.g., source base virtual volume 130). In such examples, instructions 521 may process the replicated host write request 184, by a process including writing new data specified by the replicated host write request 184 to target virtual volume tree 555 via a host write process of the target storage system that performs snapshot data preservation based on overwrites, as described above.

For example, the replicated host write request 184 may target extent E3 of target base virtual volume 130 (i.e., the copy of host virtual volume 110 of FIG. 1), and the host write process may perform copy-on-write based on overwrites to volumes from which a snapshot has been taken. In such examples, the host write process of instructions 521 may determine that the new data is a first write to virtual volume 130 at extent E3 since the snapshot represented by snapshot virtual volume 230 was taken. In response, instructions 521 may first copy the existing data at extent version 103 to virtual volume 203 at extent E3 as new extent version 203 (shown in bold) and replacing pointer 203, and then instructions 521 may write the new data of write request 184 to virtual volume 130 at extent E3 as new extent version 103 (shown in bold) and replacing the prior extent version 103. In this manner, instructions 521 may process the replicated host write request 184 via a host write process of the target storage system that performs snapshot data preservation based on overwrites, as described above.

In examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example illustrated in FIG. 1, storage medium 120 and storage medium 520 may each be implemented by one machine-readable storage medium, or multiple machine-readable storage media.

In examples described herein, a storage array may be a computing device comprising a plurality of storage devices and one or more controllers to interact with host devices and control access to the storage devices. In some examples, the storage devices may include HDDs, SSDs, or any other suitable type of storage device, or any combination thereof. In some examples, the controller(s) may virtualize the storage capacity provided by the storage devices to enable a host to access a virtual volume made up of storage space from multiple different storage devices.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein. All of the features disclosed in this specification (including any accompanying claims, abstract and drawings), and/or all of the elements of any method or process so disclosed, may be combined in any combination, except combinations where at least some of such features and/or elements are mutually exclusive. For example, functionalities described herein in relation to any of FIGS. 1-5 may be provided in combination with functionalities described herein in relation to any other of FIGS. 1-5.

What is claimed is:

1. A method comprising:
    causing creation of an empty target virtual volume tree having a tree structure of a source virtual volume tree, the source virtual volume tree comprising source base and source snapshot virtual volumes, each representing respective versions of a plurality of extents, wherein each of the extents corresponds to a different portion of an address space of the source base virtual volume; and
    for each of multiple different extents:
        identifying each version of the extent that is populated with data among the source base and source snapshot virtual volumes;
        compressing the identified versions of the extent relative to one another, such that the compression is performed exclusively over versions of the extent from the source base and source snapshot virtual volumes, to generate a compressed extent collection including a compressed representation of multiple identified versions of the extent; and
        providing the compressed extent collection via a communication channel; and providing location information to indicate where the identified versions of the multiple different extents are to be stored among the target base and target snapshot virtual volumes.

2. The method of claim 1, further comprising:
providing the respective compressed extent collections for the multiple different extents while the source base virtual volume is online to service host input/output (IO) requests.

3. The method of claim 2, further comprising:
in response to receiving a host write request targeting the source base virtual volume during the providing the respective compressed extent collections:
replicate the host write request to the target base virtual volume, during the providing the respective compressed extent collections.

4. The method of claim 3, wherein, for each of the multiple different extents, the providing the compressed extent collection comprises:
providing the compressed extent collection with a maintenance write flag to cause the extent versions represented in the compressed extent collection to be written to the target base and target snapshot virtual volumes via a maintenance write process that does not perform copy-on-write or redirect-on-write based on overwrites.

5. The method of claim 4, further comprising, for each of the multiple different extents:
decompress the compressed representation of the identified versions of the extent; and
in response to determining that the compressed extent collection is provided with the maintenance write flag, writing the decompressed extent versions to the target base and target snapshot virtual volumes via the maintenance write process that does not perform copy-on-write or redirect-on-write based on overwrites.

6. The method of claim 4, wherein the replicated host write request is provided to the target base virtual volume without a maintenance write flag to cause the replicated write request to be performed to the target base virtual volume via a host write process that performs snapshot data preservation based on overwrites.

7. The method of claim 6, further comprising:
in response to the replicated host write request not having the maintenance write flag, writing data included in the replicated host write request to the target base virtual volume via the host write process that performs snapshot data preservation based on overwrites.

8. The method of claim 1, wherein the location information is to identify, for each of the identified versions of the multiple different extents, a location in the address space at which to store the identified version of the extent in one of the target base and the target snapshot virtual volumes.

9. The method of claim 1, further comprising:
creating snapshot metadata for the target virtual volume tree that is the same as snapshot metadata for the source virtual volume tree, based on the received compressed extent collections and the received location information;
wherein, for extent versions of the target virtual volume tree that are not populated, the snapshot metadata comprises pointers to respective populated extent versions.

10. The method of claim 1, further comprising:
maintaining an access path for the target base and target snapshot virtual volumes in an asymmetric logical unit access (ALUA) standby state while the compressed extent collections are provided; and
after the compressed extent collections are provided:
setting an access path for the source base and source snapshot virtual volumes to the ALUA standby state; and
setting the access path for the target base and target snapshot virtual volumes to an ALUA active state.

11. An article comprising at least one non-transitory machine-readable storage medium comprising instructions executable by at least one processing resource of a target storage system to, during a target copy creation process:
create, on the target storage system, a target virtual volume tree comprising target base and snapshot virtual volumes and having a tree structure of a source virtual volume tree of a source storage system, the source virtual volume tree comprising source base and snapshot virtual volumes each representing respective versions of a plurality of extents, and wherein each of the extents corresponds to a different portion of an address space of the source base virtual volume;
receive a plurality of compressed extent collections, each comprising a compressed representation of multiple populated versions of a single extent from the source base and snapshot virtual volumes, the multiple populated versions compressed relative to one another; and
for each received compressed extent collection:
decompress the compressed extent collection to obtain decompressed versions of a single extent of the source virtual volume tree; and
store the decompressed versions of the single extent in the target base and snapshot virtual volumes via a maintenance write process that does not perform snapshot data preservation based on overwrites.

12. The article of claim 11, the instructions comprising instructions executable to:
receive location information for the compressed data collections; and
for each of the received compressed data collections:
store each of the versions of the extent of the compressed extent collection in a respective one of the target base and target snapshot virtual volumes based on the received location information.

13. The article of claim 12, wherein the instructions comprise instructions executable to:
receive, from the source storage system, a replicated host write request that replicates a host write request targeting the source virtual volume tree, the host write request received by the source storage system during a time in which compressed extent collections are being received; and
write new data specified by the replicated host write request to the target virtual volume tree, via a host write process of the target storage system, wherein the host write process performs snapshot data preservation based on overwrites.

14. The article of claim 12, the instructions to create the target virtual volume tree comprise instructions executable to:
create snapshot metadata for the target virtual volume tree, the snapshot metadata including, for each unpopulated extent version in any of the one or more target snapshot virtual volumes, a link from the unpopulated extent version to another version of the same extent.

15. The article of claim 14, wherein the instructions to create the snapshot metadata for the target virtual volume tree comprise instructions to:

create the target virtual volume tree such that, before receiving any of the compressed extent collections:
each extent version of the target base virtual volume is unpopulated; and
each extent version of each target snapshot virtual volume comprises a pointer to another version of the same extent in the target base or another target snapshot virtual volume; and
wherein the instructions to store the decompressed versions are further to remove the pointer of any extent version for which a decompressed extent version is stored to one of the target snapshot virtual volumes.

16. The article of claim 15, wherein the instructions comprise instructions executable to:
for each received compressed data collection:
write each version of the single extent to a respective one of the target base and target snapshot virtual volumes, via a maintenance write process of the target storage system, wherein the maintenance write process does not perform copy-on-write or redirect-on-write based on overwrites and is permitted to write to read-only snapshots.

17. A system comprising:
a target storage system comprising at least one processing resource, and at least one non-transitory machine-readable storage medium comprising instructions executable by the at least one processing resource to:
create, on the target storage system, a target virtual volume tree comprising target base and snapshot virtual volumes and having a tree structure of a source virtual volume tree of a source storage system, the source virtual volume tree comprising source base and snapshot virtual volumes each representing respective versions of a plurality of extents, and wherein each of the extents corresponds to a different portion of an address space of the source base virtual volume;
receive a plurality of compressed extent collections, each comprising a compressed representation of multiple populated versions of a single extent from the source base and snapshot virtual volumes, the multiple populated versions compressed relative to one another; and
for each received compressed extent collection:
decompress the compressed extent collection to obtain decompressed versions of a single extent of the source virtual volume tree; and
store the decompressed versions of the single extent in the target base and snapshot virtual volumes via a maintenance write process that does not perform snapshot data preservation based on overwrites; and
in response to receiving a replicated host write targeting the source base virtual volume, write the data of the replicated host write to the target base virtual volume via a host write process that performs snapshot data preservation based on overwrites.

18. The system of claim 17, wherein:
the maintenance write process does not perform copy-on-write or redirect-on-write based on overwrites; and
the host write process performs copy-on-write or redirect-on-write based on overwrites.

19. The system of claim 17, further comprising:
the source storage system, comprising at least one source processing resource, and at least one source non-transitory machine-readable storage medium comprising source instructions executable by the at least one source processing resource to:
for each of multiple different extents of the source virtual volume tree:
identify each version of the extent that is populated with data among the source base and source snapshot virtual volumes; and
compress the identified versions of the extent relative to one another, such that the compression is performed exclusively over versions of the extent from the source base and source snapshot virtual volumes, to generate one of the compressed extent collections.

20. The system of claim 19, wherein the source instructions are executable by the at least one source processing resource to:
for each of the multiple different extents of the source virtual volume tree, provide the compressed extent collection to the target storage system.

* * * * *